US010374528B2

(12) United States Patent
Lieu et al.

(10) Patent No.: US 10,374,528 B2
(45) Date of Patent: Aug. 6, 2019

(54) EFFICIENT ENERGY RECOVERY IN DISK DRIVE DURING POWER LOSS

(71) Applicant: Seagate Technology LLC, Cupertino, CA (US)

(72) Inventors: Binh Kim Lieu, Minneapolis, MN (US); Mark Lowell Elliott, Eden Prairie, MN (US); Raye A. Sosseh, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/714,151

(22) Filed: Sep. 25, 2017

(65) Prior Publication Data

US 2018/0076742 A1    Mar. 15, 2018

Related U.S. Application Data

(63) Continuation of application No. 14/039,724, filed on Sep. 27, 2013, now Pat. No. 9,780,700.

(51) Int. Cl.
| *H02K 7/14* | (2006.01) |
| *H02P 3/18* | (2006.01) |
| *H02J 9/06* | (2006.01) |
| *G06F 1/26* | (2006.01) |

(52) U.S. Cl.
CPC ............... *H02P 3/18* (2013.01); *G06F 1/263* (2013.01); *H02J 9/06* (2013.01)

(58) Field of Classification Search
CPC ............................. H05H 3/26; B04B 13/003
USPC ............................................................ 318/3
See application file for complete search history.

(56) References Cited

U.S. PATENT DOCUMENTS

| 6,137,253 | A | 10/2000 | Galbiati et al. |
| 6,762,901 | B2* | 7/2004 | Hill ...................... G11B 5/5526 318/461 |
| 7,042,672 | B2 | 5/2006 | Brenden et al. |
| 7,705,548 | B2 | 4/2010 | Galbiati |
| 8,415,908 | B2 | 4/2013 | Galbiati |
| 2003/0021057 | A1* | 1/2003 | Hill ...................... G11B 5/5526 360/77.02 |
| 2004/0080858 | A1* | 4/2004 | Suzuki ................... G11B 5/54 360/75 |
| 2006/0066980 | A1 | 3/2006 | Brenden et al. |
| 2009/0026990 | A1 | 1/2009 | Galbiati et al. |

(Continued)

OTHER PUBLICATIONS

May 2012, Bogdan et al., "Identification of Mechanical Parameters at Low Velocities for a Micropositioning Stage Using a Velocity Hysteresis Model", International Conference on Robotics and Automation, May 14-18, 2012, 6 pages.

(Continued)

*Primary Examiner* — Eduardo Colon Santana
*Assistant Examiner* — Gabriel Agared
(74) *Attorney, Agent, or Firm* — Hollingsworth Davis, LLC

(57) ABSTRACT

A back electromotive force of a rotating motor is converted into a voltage for a load by driving, in accordance with a duty cycle, at least one switching circuit that couples the back electromotive force to a load through a rectifying circuit. An error signal is generated that is a difference between the load voltage and a reference voltage. The duty cycle is controlled as a function of the error signal to cause the load voltage to approach the reference voltage.

20 Claims, 8 Drawing Sheets

(56) References Cited

U.S. PATENT DOCUMENTS

| | | | |
|---|---|---|---|
| 2010/0053802 A1* | 3/2010 | Yamashita | G11B 5/5547 |
| | | | 360/78.04 |
| 2010/0149695 A1* | 6/2010 | Tanner | G11B 21/12 |
| | | | 360/294.5 |
| 2010/0165811 A1 | 7/2010 | Bonvin | |
| 2012/0161678 A1 | 6/2012 | Maiocchi et al. | |
| 2015/0091475 A1 | 4/2015 | Lieu et al. | |

OTHER PUBLICATIONS

Sep. 2003, Caliskan et al., "Analysis of Three-Phase Rectifiers with Constant-Voltage Loads", IEEE Transactions on Circuits and Systems—I: Fundamental Theory and Applications, vol. 50, No. 9, Sep. 2003, pp. 1220-1226.

Oct. 15, 2010, Dixon, "Three-Phase Controlled Rectifiers", Power Electronics Handbook, $3^{rd}$ Edition, Chapter 12, Oct. 15, 2010, 62 pages.

* cited by examiner

EFFICIENT ENERGY RECOVERY IN DISK DRIVE DURING POWER LOSS

CROSS-REFERENCE TO RELATED APPLICATIONS

This application is a continuation of U.S. Ser. No. 14/039,724, filed Sep. 27, 2013, which is incorporated herein by reference in its entirety.

SUMMARY

Some embodiments involve a method of converting a back electromotive force of a rotating motor into a voltage for a load by driving, in accordance with a duty cycle, at least one switching circuit that couples the back electromotive force to a load through a rectifying circuit. An error signal is generated that is a difference between the load voltage and a reference voltage. The duty cycle is controlled as a function of the error signal to cause the load voltage to approach the reference voltage.

According to some implementations, a power back-up system includes at least one rectifier. The system includes at least one switching circuit, the at least one switching circuit configured to couple a back electromotive force from a disk drive rotating motor to a load through the at least one rectifying circuit. The system includes a pulse width modulator configured to drive the switching circuit according to a duty cycle. The system includes a control system comprising error circuitry configured to determine a difference between a load voltage and a reference voltage and a feedback controller configured to control the duty cycle as a function of the error signal to cause the load voltage to approach the reference voltage.

Some embodiments involve a memory system that includes a disk drive comprising a motor. The system includes a non-volatile cache. A power back-up system comprises at least one rectifier and at least one switching circuit, the at least one switching circuit configured to couple a back electromotive force from a rotating motor to a load through the at least one rectifying circuit. The system includes a pulse width modulator configured to drive the switching circuit according to a duty cycle. The system includes a control system comprising error circuitry configured to determine a difference between a load voltage and a reference voltage and a feedback controller configured to control the duty cycle as a function of the error signal to cause the load voltage to approach the reference voltage.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

During a controlled power loss in a memory system, e.g., when an operating system directs the memory system to shut down, the memory system will ensure that various tasks are completed before the power is removed. For example, the system may move a read/write head away from a disk, and store data in a non-volatile memory, for example, before the power is removed from the memory system. However, in some cases, the power may be removed from a memory system unexpectedly, leaving very little time to deal these tasks. Energy from a rotating motor of the memory system may be used to provide power to complete the shutdown tasks. As the complexity of memory systems increases, more tasks are performed upon a power loss.

The auxiliary power harvested by the motor during an unexpected power loss may not be sufficient to move the read/write head to a safe location and accomplish all of the other tasks. As more power demands are placed on a hard drive after power is lost, the memory system runs into danger of not having adequate power available for the memory system to perform all of the tasks. Furthermore, this problem is may be amplified in situations where the motor performance deteriorates in hot and/or cold temperatures. For example, a grease may degrade with heat, and subsequently at cold temperatures it may be difficult to move the read/write head over the grease ridge that forms due to the cold degraded grease on the actuator.

The amount of power available to complete these tasks can be enhanced by increasing the energy harvested from the motor. As disclosed herein, harvesting energy from the rotating disk can be accomplished by a feedback control system. The back electromotive force generated by the motor can be routed to supply voltage to a load through switching circuitry controlled by an error signal of the feedback control system.

Figure 1:
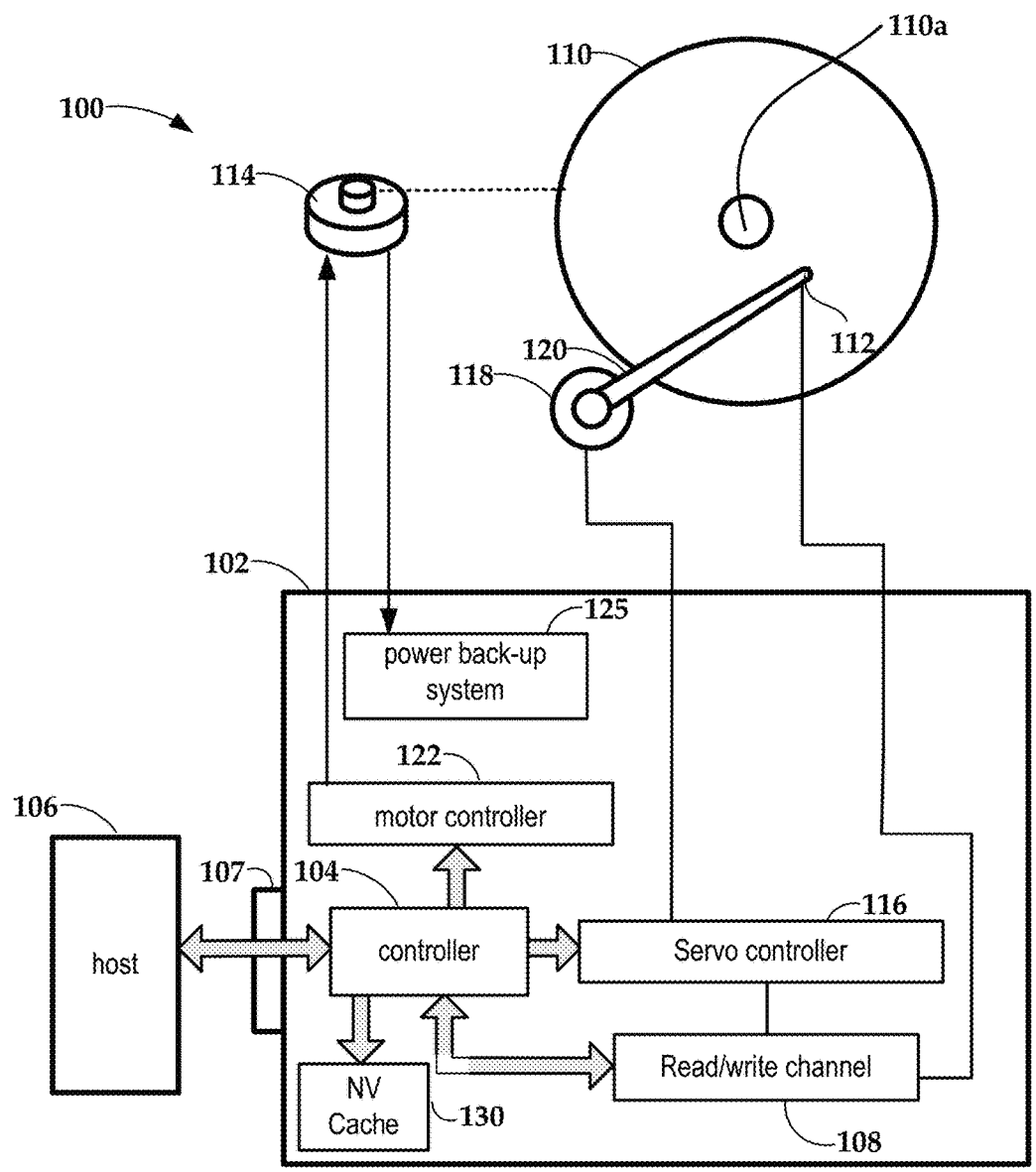
FIG. 1 illustrates a block diagram illustrates components of a memory apparatus according to embodiments described herein.

In reference now to FIG. 1, a block diagram illustrates components of a memory system 100 that includes a power back-up system 125 according to embodiments described herein. It will be appreciated that this and other embodiments may be described herein as a memory system that includes a hard drive for purposes of illustration, and not of limitation. Some implementations may involve memory types other than hard disk drives, or may involve multiple types of memory such as flash and hard disk memory used together in a hybrid drive.

The apparatus 100 includes circuitry 102 that is coupled to electromechanical components 114, 118. The circuitry 102 includes a data controller 104 that controls a number of functions of the apparatus 100, including communications between the apparatus 100 and a host device 106 via a host interface 107. The host device 106 may include any electronic device that can be communicatively coupled to store and retrieve data from an HDD, e.g., a computer. The data controller 104 may carry out write commands by formatting the associated data into sectors with the appropriate header information, and transferring the formatted data via a read/write channel 108 to the data storage surface of a disk 110. The controller 104 may provide analogous functions for read commands, e.g., determining the location of the desired data, moving the heads to the location (track) of the data, reading the data from the disk 110 via the read/write channel, correcting any errors and formatting the data for the host 106, etc.

The read/write channel 108 converts data between the digital signals processed by the data controller 104 and the analog signals conducted through read/write heads 112. The read/write channel 108 also provides servo data read from the disk 110 to a servo controller 116. The servo controller 116 uses these signals to drive an actuator 118 (e.g., voice coil motor, or VCM) that rotates an armature 120, upon which the read/write heads 112 are mounted. The heads 112 are moved radially across different tracks of the disk(s) 110 by the actuator motor 118 while a spindle motor 114 rotates the disk(s) 110. The data controller 104 controls the spindle motor 114 by way of a motor controller 122. A power back-up system 125 harvests energy from the rotation of the spindle and disk. Upon emergency power loss, mechanical energy from the spindle motor is converted to electrical energy that is supplied to a load comprising circuitry that perform shut-down tasks. The motor serves as a generator and provides auxiliary power in the event of power loss. In the event of a loss of external power, energy from the power back-up system can be used to implement the various shut-down tasks. For example, the shut-down tasks can include powering the VCM to move the armature 120 so that the heads 112 are positioned (parked) in a safe location away from the disk(s) 110, among other tasks.

According to various implementations, the 100 includes a non-volatile cache 130 for the disk. In some embodiments, the non-volatile cache 130 can serve as a back-up data cache in the event of power loss. Additionally, the non-volatile cache 130 can serve as a read cache or write cache for the primary memory of a memory apparatus. In implementations that use a read or write cache, a magnetic disk may serve as a primary memory which has greater storage capacity but slower access times than the non-volatile cache, for example. The memory apparatus 100 may comprise a tiered memory device such as a hybrid drive, which can use one or multiple levels of caching. In a hybrid drive, the primary memory may comprise a nonvolatile memory such as magnetic disk, magnetic tape, and/or optical disk and the cache may comprise solid state flash memory, and/or other type of memory. The data controller 104 can be arranged to write data to the non-volatile cache 130 in response to a power loss. Additionally or alternatively, there may be other data management events that occur in the event of a power loss. For example, the value of various system state parameters can be stored in the back-up cache 130. When power returns to the system 100 following a power loss, the system state parameters and/or data can be retrieved from the non-volatile cache 130 and used to restore the system 100 to its pre-power loss condition.

During an expected power loss, e.g., when the operating system directs the system to shut down, the system completes various shut-down tasks in a power loss sequence which is not time constrained because power is removed after the power loss sequence has been completed. For example, in an expected shut down, a power-loss sequence may be employed to ensure that the read/write head in the memory system is in a safe location away from the disk and that all read/write operations currently being executed are completed.

An emergency shut down occurs when power is unexpectedly lost due to a computer being suddenly unplugged or a battery being disconnected, for example. When power is lost, the spindle motor 114, spindle 110a, and disk 110 remain spinning based on the inertia of these components, which were spinning at the time of the power loss. When this occurs, the spindle motor 114 operates as a generator, generating a voltage (referred to as a back electromotive force, or BEMF) across the spindle motor windings. The BEMF generated may be used to provide power to perform shut-down tasks such as parking the read/write head and storing data and/or state information.

According to various implementations, the apparatus 100 uses the inertia of the spindle motor and converts the rotation of the spindle motor to electrical energy when an unexpected power loss occurs. The energy generated from the rotation of the disk as it gradually slows after the power loss is harvested to maintain a specified load voltage to allow back-up tasks to be completed in the absence of external power supplied to the system. The electromotive force generated by the rotation of the spindle motor depends on the speed of rotation and the electrical constant of the motor. Power may be transferred from the spindle motor to the load using a switched rectifier circuit operated by a pulse width modulator. By rectifying the back electromotive forces (BEMF) induced in the phase windings of the motor, a rectified charge current is produced. This charge current can be used to supply power for various shut-down tasks after a power loss occurs.

Figure 2:
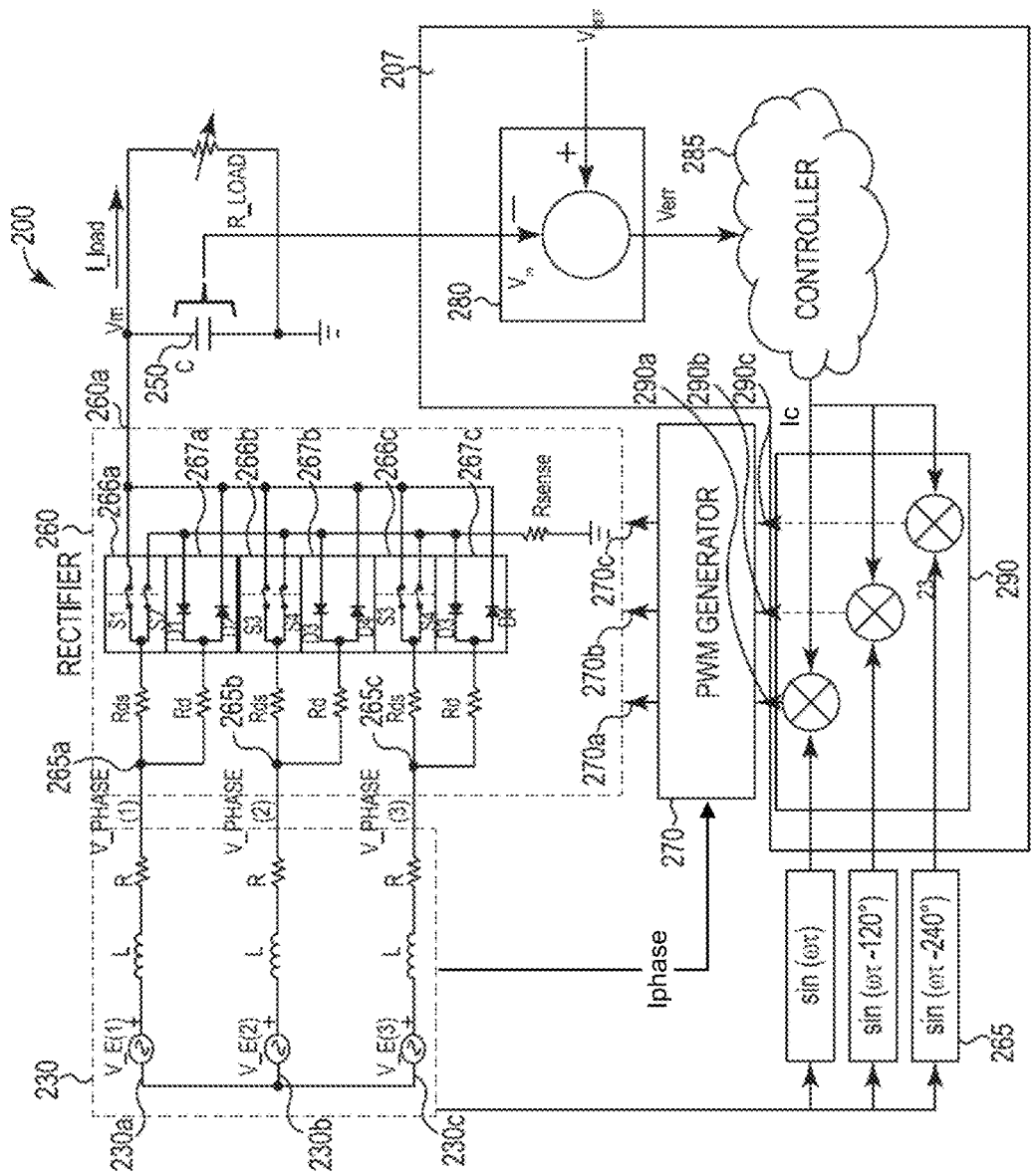
FIG. 2 is a diagram of a system capable of generating power in the case of an unexpected power loss.

FIG. 2 is a block diagram of a power back-up system 200 capable of harvesting energy from the rotating disk and providing power to accomplish various shut-down tasks in the case of an unexpected power loss. For the back-up system 200, the spindle motor, that under normal operating conditions rotates a spindle (110a, FIG. 1) with attached disks (110, FIG. 1), is operated as a generator 230 to harvest energy from the rotation of the disk. According to various embodiments, the spindle motor 230 is a brushless direct-current type motor that, under normal operation, is driven synchronously by a motor controller (122, FIG. 1). The power back-up system 200 may also include switched rectifier circuitry 260 that is used to direct the charge current generated by the rotating motor (operating as a generator 230) to a load represented by R_load in FIG. 2. Capacitor 250 provides a filter capacitor that helps to reduce the ripple effects from the conversion of an AC to a DC signal. As shown, the switched rectifier circuitry 260 in FIG. 2 includes three sets of switches 266a-c and three half bridge rectifiers 267a-c. The switches 266a-c in the rectifier circuitry 260, which may be implemented as MOSFET transistors, are turned off or on depending on the rotational position of the spindle and are controlled by pulses from pulse width modulator 270. The pulse width modulator 270 is controlled by controller 207, the operation of which is discussed in greater detail below.

The back electromotive forces, $BEMF_1$, $BEMF_2$, and $BEMF_3$ produced by the motor-generator 230 depend on the rotational phase of the motor-generator 230. The BEMFs, $BEMF_1$, $BEMF_2$, and $BEMF_3$ produce voltages $V_1$, $V_2$, and $V_3$ at the three-phase output 265a-c of the motor-generator 230. $V_1$, $V_2$, and $V_3$ are sinusoidal voltages having angular frequency, ω, and 120 degrees phase difference. For example, $V_1$=A sin(ωt), $V_2$=A sin(ωt−120°), and $V_3$=A sin(ωt−240°), where A is a constant, ω is the rotational frequency of the motor-generator, and t is time.

By changing the duty cycle of each phase's pair of switches 266a-c for the half bridges 267a-c, in synchrony with the motor speed, the voltage, Vm, can be controlled. The capacitor 250 reduces the ripple of coordinated pulses from each phase output 265a-c of the motor-generator 230 according to the pulse width modulated (PWM) signals 270a-c. The PWM signals 270a-c have complex duty cycles and that are suited to maintain a specified voltage Vm under load. Thus, the MOSFET switches 266a-c for each of the half bridges 267a-c can be switched on and off by the PWM generator 270 to produce switching signals 270a, 270b, 270c having duty cycles that maintain a specified voltage, Vm, to the load R_load.

When connected to a load R_load, a load current I_load is drawn from the power back-up system 200, which can cause a decrease in the load voltage, Vm. The power back-up system 200 described herein can be designed to maintain the voltage Vm to a specified value, e.g., to a value within a specified percentage of a reference voltage Vref. The amount of charge current flowing into R_load from the rectifier output 260a is increased or decreased to maintain the voltage, Vm, to within the specified voltage range. The increase or decrease in the charge current flowing to R_load is controlled by a control system 207 that includes an error detector 280, a synchronizer, 290, and a feedback controller 285.

The error detector 280 detects a difference between Vm and the reference voltage Vref and provides an error signal, Verr, that is or is proportional to Vref−Vm, to the feedback controller 285. The feedback controller 285, may be a proportional-integral (PI) controller, a proportional-integral-derivative (PID) controller, a linear-quadratic-regulator (LQR) controller, an adaptive controller, or may be any other suitable type of feedback controller that utilizes the error signal, Verr, to produce a control signal, Ic. Synchronization is accomplished by multiplying Ic by each of the three sine waves 265 that represent the motor-generator speed and phase for three phases, sin(ωt), sin(ωt−120°), and sin(ωt−240°), where ω is the angular velocity (frequency) of the motor rotation. The duty cycles for each of the signals 290a, 290b, 290c are the same, but phase-different. The synchronized control signals 290a, 290b, 290c are applied to the PWM generator 270 and control the PWM outputs 270a, 270b, 270c. The PWM outputs 270a, 270b, 270c in turn control the switching circuits 266a, 266b, 266c of the three-phase rectifier 260. In the synchronizer 290, the signals 290a, 290b, 290c are compared to the corresponding currents from each phase, represented by I phase, in FIG. 2, to determine the duty cycles of the PWM.

The load, R_load, may include read/write channel circuitry and/or read/write head actuation devices, and/or other circuitry involved in the shut-down process. By controlling the PWM outputs 270a, 270b, 270c applied to the switches 266a-b of the rectifier circuitry 260 using the control system 207, the amount of time to complete the shut-down tasks is increased. As the load R_load draws more load current I_load, the synchronized control signals 290a, 290b, 290c cause the duty cycle of the PWM outputs to increase to provide more charge current at the output of the rectifier 260a to the load R_load. The increased charge current serves to maintain Vm within the specified range of Vref. Under lighter loads, the duty cycle of the PWM outputs may be decreased because less charge current is needed to maintain Vm at the specified voltage level. The power back-up system 200 illustrated in FIG. 2 maintains the voltage, Vm, that supplies the load, R_load, with enough power to complete the shut-down tasks. Power to operate switching rectifier circuitry 260, pulse width modulator 270, synchronizer 290 and control system 207 may be supplied by the power back-up system 200

The control system 207 is a feedback controller that controls the duty cycle of the PWM signals as a function of the error signal, Verr, and may implement one or more of proportional control, proportional derivative control, proportional integral control, proportional integral derivative control, and/or other types of feedback control. A proportional control system controls the duty cycle in proportion with the error signal. A proportional derivative control system uses a damping constant multiplied by a derivative of the error signal.

Proportional control may be represented by the equation:

$$u(t) = K_p e(t) \qquad \text{Equation [1]}$$

where u(t) is the controller output, $K_p$ is the proportional gain of the system, and e(t) is the error as a function of time t.

A proportional derivative control system uses a damping constant multiplied by a derivative of the error signal. Proportional derivative control may be characterized by Equation [2]:

$$u(t) = K_p e(t) + K_d \frac{d}{dt} e(t) \qquad \text{Equation [2]}$$

where $K_d$ is the derivative gain of the system.

A proportional integral control system uses an integral gain parameter multiplied an integral of the error signal over time. Proportional integral control can be represented by the following equation:

$$u(t) = K_p e(t) + K_d \frac{d}{dt} e(t) + K_i \int_0^t e(\tau) d(\tau) \qquad \text{Equation [4]}$$

where $K_i$ is the integral gain of the system.

A proportional integral derivative controller uses an integral gain parameter multiplied by a damping constant. Proportional integral derivative control can be characterized by the following equation:

$$u(t) = K_p e(t) + K_i \int_0^t e(\tau) d(\tau) \qquad \text{Equation [3]}$$

Figure 3:
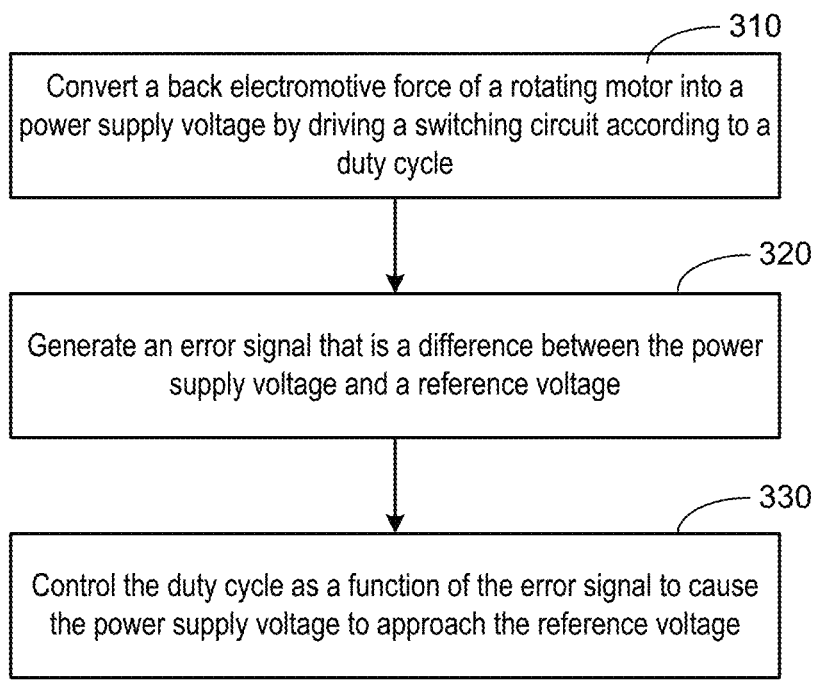
FIG. 3 is a flow diagram that illustrates a method for utilizing an error signal in the event of an unexpected power loss in a memory system in accordance with various implementations.

FIG. 3 is a flow diagram that illustrates a method in accordance with various implementations. A back EMF of a rotating motor is converted 310 into a voltage for a load. According in some embodiments, the conversion of the back EMF is accomplished by driving, in accordance with a duty cycle, at least one switching circuit that couples the back EMF to a load through a rectifying circuit. An error signal that is a difference between the load voltage and a reference voltage is generated 320. The duty cycle used to operate the at least one switching circuit is controlled 330 as a function of the error signal to cause the load voltage to approach the reference voltage.

Figure 4:
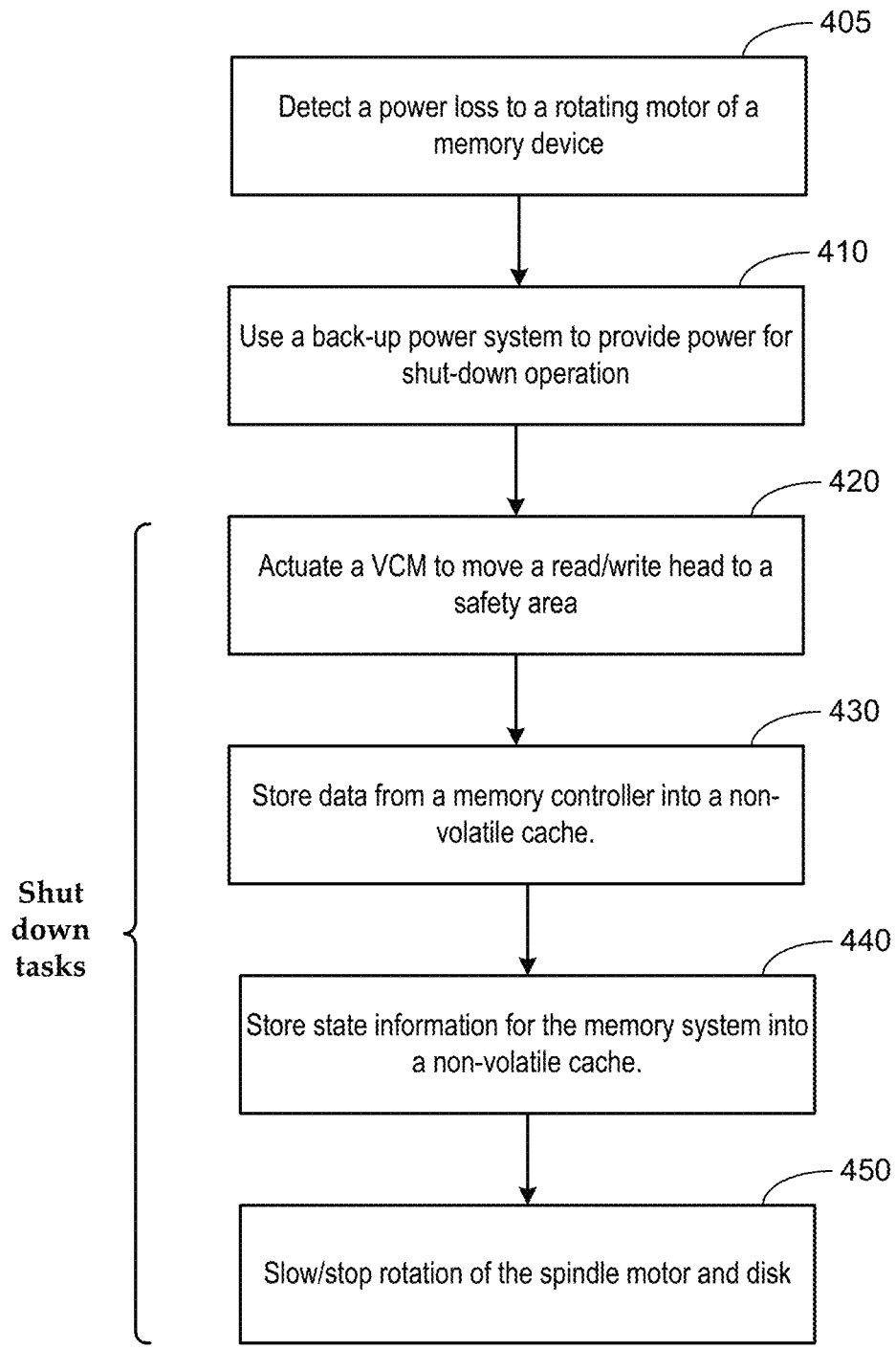
FIG. 4 shows a method for completing shut-down tasks in the event of an unexpected power loss in accordance with embodiments described herein.
Figure 5:
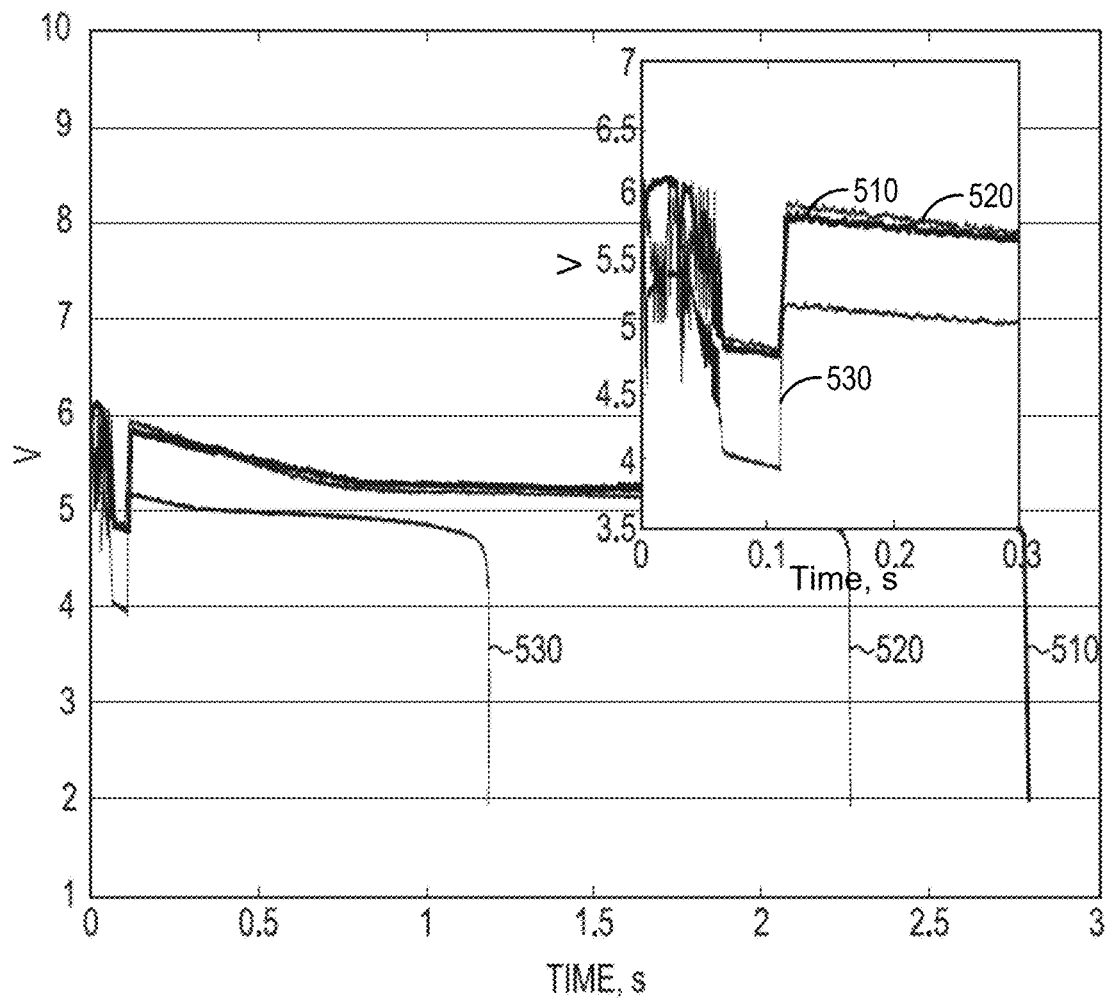
FIG. 5 illustrates the magnitude and the time that a loading voltage can be sustained following an unexpected power loss with systems experiencing three different temperatures and utilizing the same type of control system.

The load voltage provided by the process of FIG. 3 may be used to power circuitry to complete various shut-down tasks. FIG. 4 is a flow diagram illustrating a process for completing shut-down tasks in the event of an unexpected power loss in accordance with embodiments described herein. Power loss occurs when the voltage of the externally supplied power source decreases below a predetermined voltage that is needed to reliably operate system components. A power loss to a memory system is detected 410, e.g., by sensing a voltage decrease of the externally supplied power. During and/or after the power loss occurs, a back-up power system is used to provide power to system components for a shut-down operation of the memory system during which one or more shut-down tasks are implemented. The shut-down tasks may be prioritized to ensure that more important tasks have sufficient amount of power to be completed. The shut-down tasks can include actuating 420 one or more VCMs to move a read/write head to a safety area in response to the detection of the loss of power. Additionally or alternatively, data in the data channel of the memory device controller that is in transit between the memory controller and the host may be stored 430 to a non-volatile cache in response to the detection of the loss of power. State information for the memory system may be stored 440 in the non-volatile cache in response as a part of the shut-down process. Other optional shut-down tasks include slowing and/or stopping 450 the rotation of the spindle motor and disk.

Higher temperatures, colder temperatures and/or temperature cycling can produce mechanical phenomena that may involve higher energy to accomplish shut-down tasks. For example, grease may degrade with heat, and subsequently at cold temperatures it may be difficult to move the read/write head over the grease ridge that forms due to the cold degraded grease on the actuator. In applications that use high-performance hard-disk drives, a grease ridge can be formed near the outer diameter of the disk where the entrance of the ramp is located. The ramp is the safe location where the head needs to be parked during emergency retract. This grease ridge is formed when the HDD is operated continuously without any power cycles. The grease ridge is a source of problem because it poses additional constraints on the retract process. This problem is exacerbated in cold temperature (0 deg C.) because the grease ridge, which behaves like an oil substance, gets thicker and the force require to overcome it increases.

Graphs 510, 520, 530 show load voltage magnitude, Vm, with respect to time, illustrating the time that a load voltage of a power back-up system can be sustained following an unexpected power loss. Graphs 510, 520, 530 show the load voltage over time for a power back-up system with the same load under three different temperatures, hot 60 deg C., nominal 25 deg C., cold 0 deg C. In this example, the feedback controller used in the control system was a proportional integral control system. As shown, the system that was in a nominal temperature environment, represented by the line 510, and the cold temperature environment, represented by the line 520, experienced about the same voltage magnitude. However, the nominal temperature environment system was able to maintain the voltage for about a full second longer than the cold temperature environment system. This longer time period allows for more time to complete all of the shut-down tasks. The system in the hot temperature environment, represented by the line 530, had a lower voltage magnitude than the other two systems and experienced a significant drop in the amount of time that was available to complete the shut-down tasks.

Figure 6:
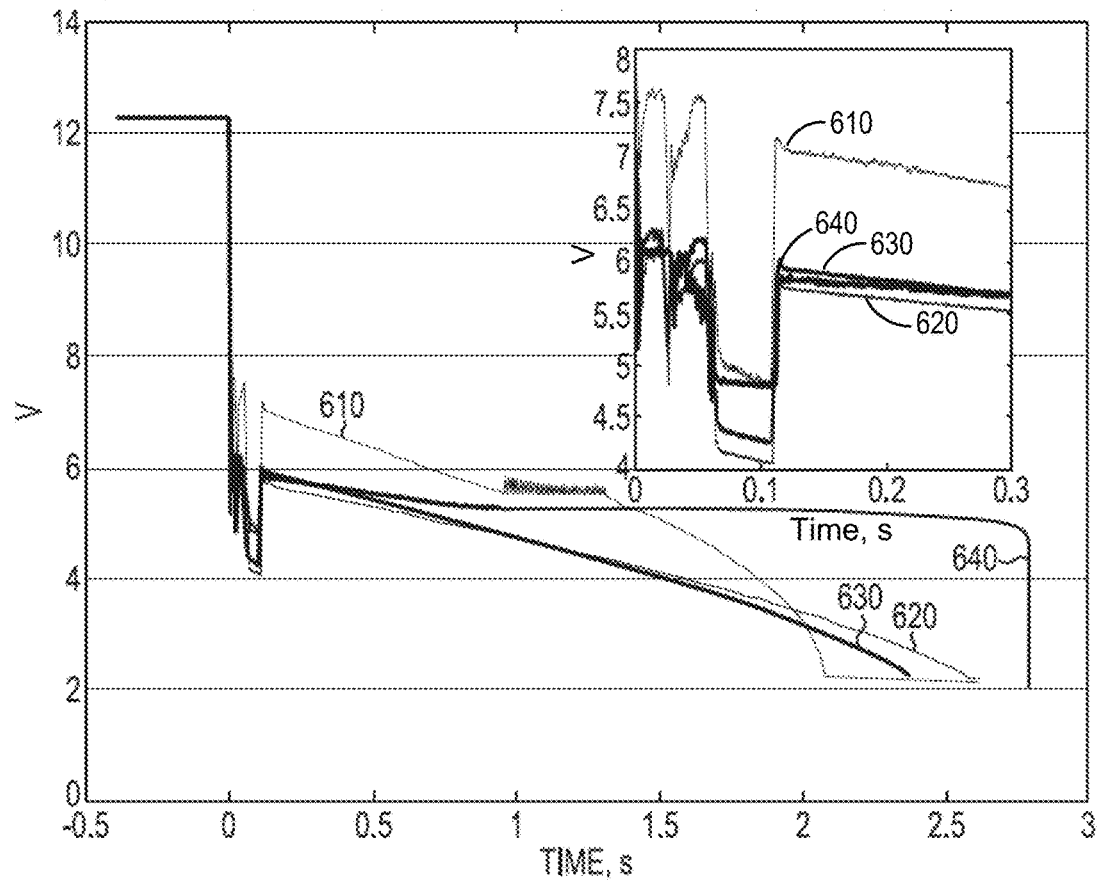
FIG. 6 shows the magnitude and the time that a loading voltage can be sustained following an unexpected power loss for four different systems at a nominal temperature utilizing different types of control systems.

FIG. 6 shows the operation of four different types of power back-up systems at a nominal temperature under the same load conditions. In this example, the system represented by line 640 utilizes a feedback control having an error signal such as a PI control system. Lines 610, 620, and 630 show the operation of three comparative power back-up systems that do not utilize feedback control. As can be observed, the voltage 640 of a power back-up system that uses utilizes an error signal for feedback control maintains a fairly constant voltage magnitude for the entire time period up until about 2.75 seconds. The voltage 610, 620, 630 of comparative systems falls off more rapidly than the voltage 640 of the power back-up system that utilizes an error-based feedback controller. In addition, line 640 indicates that the power back-up system that utilizes an error-based feedback controller allows a longer period of time for completing the shut-down tasks than each of the comparative systems represented by lines 610, 620, and 630.

Figure 7:
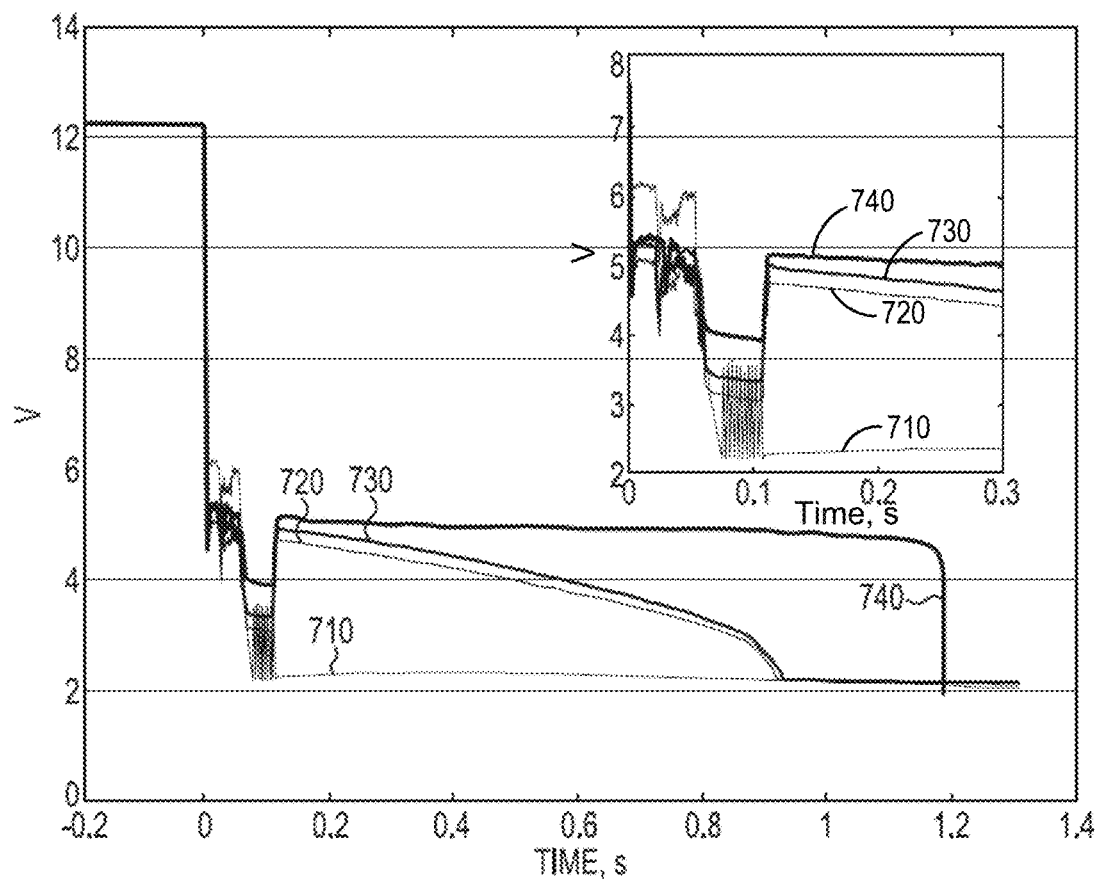
FIGS. 7 and 8 illustrate the magnitude and the time that a loading voltage can be sustained following an unexpected power loss for the same four systems as in FIG. 6 at a hot temperature and a cold temperature, respectively.
Figure 8:
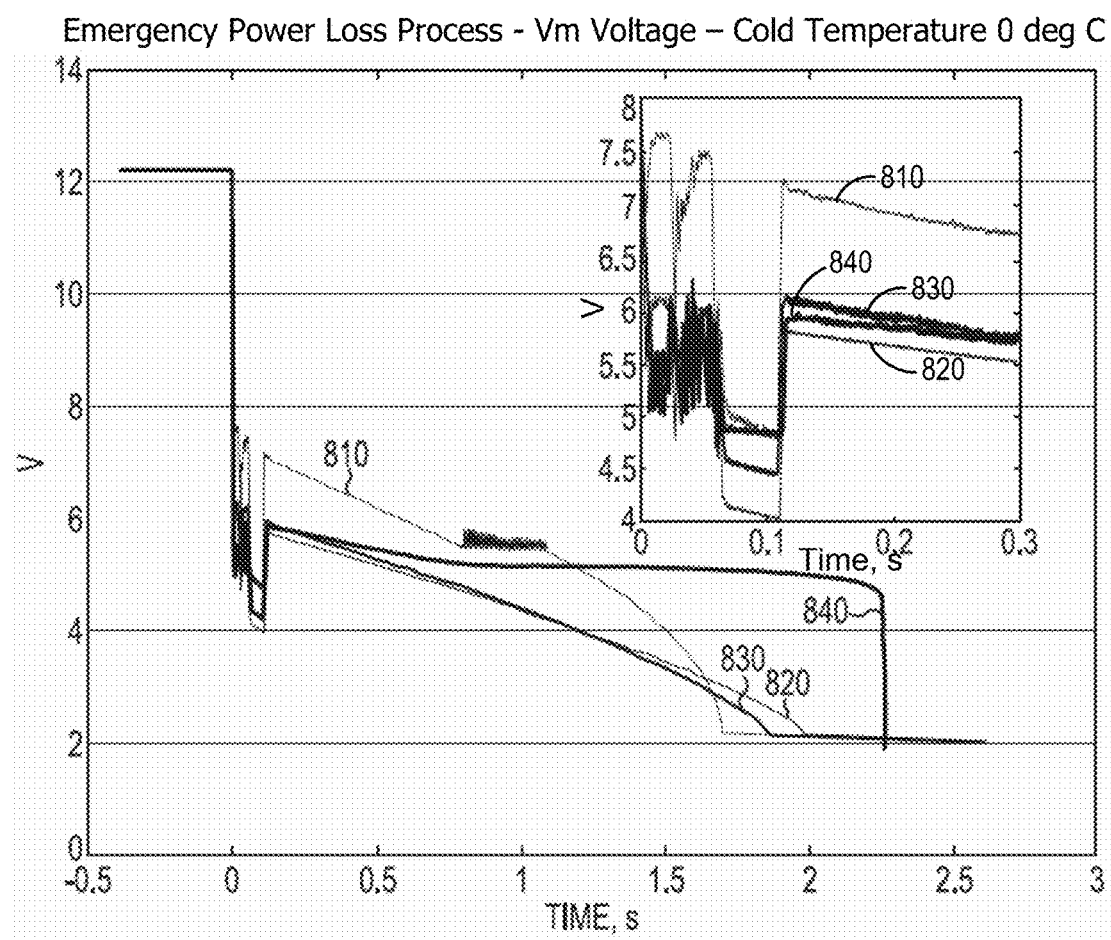

FIGS. 7 and 8 illustrate the same four systems as in FIG. 6 at the hot temperature and the cold temperature, respectively. As can be observed from both of FIGS. 7 and 8 power back-up system that utilizes an error-based feedback controller represented by line 740 in FIG. 7 and line 840 in FIG. 8 is able to sustain a higher voltage for a longer period of time than any of the comparative systems represented by lines 710, 720, and 730 in FIG. 7 and lines 810, 820, and 830 in FIG. 8, respectively. Because the power back-up system that utilizes an error-based feedback controller represented by lines 740 and 840 is able to sustain the higher voltage for a longer period of time, this system has a longer time to complete the shutdown tasks than the comparative systems represented that do not utilized an error-based feedback controller.

Each inset graph in FIGS. 5-8 zoom-in on the retract process; that is, the process of moving the head to a safe location. The nonvolatile cache write process starts immediately after the retract which ends at the time when the lowest Vm voltage takes place in the inset graphs. The electronics will fail when the Vm voltage falls below a predetermined voltage, e.g., 2.1V. Hence, the entire power loss process ends marking the amount of time available from each method.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:
1. A method, comprising:
 detecting power loss to a rotating motor of a storage device;
 in response to detecting the power loss, performing a shut-down procedure comprising:
  coupling a back electromotive force of the rotating motor to a load using a switching circuit, the load comprising components of the storage device;
  driving the switching circuit according to a duty cycle
  generating an error signal that is a difference between the back electromotive force and a reference voltage; and controlling the duty cycle as a function of the error signal to cause the back electromotive force to approach the reference voltage.

2. The method claim 1, wherein:
back electromotive force comprises three back electromotive forces that are 120 degrees out of phase with each other.

3. The method of claim 1, wherein controlling the duty cycle as a function of the error signal comprises controlling the duty cycle in proportion with the error signal.

4. The method of claim 1, wherein controlling the duty cycle as a function of the error signal comprises controlling the duty cycle in proportion with the error signal and using a damping constant multiplied by a derivative of the error signal.

5. The method of claim 1, wherein controlling the duty cycle as a function of the error signal comprises controlling the duty cycle in proportion with the error signal and using an integral gain parameter multiplied an integral of the error signal over time.

6. The method of claim 1, wherein controlling the duty cycle as a function of the error signal comprises controlling the duty cycle in proportion with the error signal, using a damping constant multiplied by a derivative of the error signal, and using an integral gain parameter multiplied an integral of the error signal over time.

7. The method of claim 1, wherein the rotating motor is a spindle motor of a hard disk drive.

8. The method of claim 1, wherein:
the components include at least a data channel controller and non-volatile cache; and
performing the shut-down procedure comprises storing data from the data controller into the non-volatile cache.

9. The method of claim 1, wherein
the components include at least a memory controller and non-volatile cache; and
performing the shut-down procedure comprises storing information that describes a state of a memory system controlled by the memory controller into the non-volatile cache.

10. The method of claim 1, wherein:
the components include at least a voice coil motor coupled to an armature that bears a read/write head of the hard disk drive; and
performing the shut-down procedure comprises actuating the voice coil motor to move the read/write head to a safety area.

11. A power back-up system for a storage device, comprising:
circuitry configured to implement a shut-down process in response to loss of power, the shut-down process including one or more shut-down tasks;
at least one rectifier;
at least one switching circuit, the at least one switching circuit configured to couple a back electromotive force from a rotating motor to at least one component of the storage device through the at least one rectifier;
a pulse width modulator configured to drive the switching circuit according to a duty cycle; and
a control system comprising:
    error circuitry configured to determine a difference between the back electromotive force and a reference voltage; and
    a feedback controller configured to regulate the duty cycle as a function of the error signal to cause the back electromotive force to approach the reference voltage.

12. The system of claim 11, further comprising a capacitor configured to reduce ripple of the load voltage.

13. The system of claim 11, wherein the feedback controller provides a feedback control signal to the pulse width modulator in response to the error signal.

14. The system of claim 13, wherein the control system includes a synchronizer configured to multiply the control signal by each of three sine waves that correspond to the motor speed and phase for three phases of motor rotation.

15. The system of claim 11, wherein the regulated back electromotive force is coupled to deliver power to a voice coil motor to move an armature carrying a read/write head to a safe location relative to a magnetic disk.

16. The system of claim 11, wherein the feedback controller is configured to implement one or more of proportional feedback control, proportional integral feedback control, proportional integral derivative feedback control, linear, quadratic regulator control, and adaptive control.

17. A memory system, comprising:
a disk drive comprising a motor;
a non-volatile cache;
a power back-up system, comprising:
    circuitry configured to implement a shut-down process in response to loss of power, the shut-down process including one or more shut-down tasks;
    at least one rectifier;
    at least one switching circuit, the at least one switching circuit configured to couple a back electromotive force from a rotating motor to at least one component of the memory system through the at least one rectifier;
a pulse width modulator configured to drive the switching circuit according to a duty cycle; and
a control system comprising:
    error circuitry configured to determine a difference between the back electromotive force and a reference voltage; and
    a feedback controller configured to regulate the duty cycle as a function of the error signal to cause the back electromotive force to approach the reference voltage.

18. The memory system of claim 17, wherein the shut-down tasks comprise moving an armature carrying a read/write head to a predetermined location in response to detection of external power loss.

19. The memory system of claim 17, wherein the shut-down tasks comprise storing data to the non-volatile cache.

20. The memory system of claim 17, wherein the shut-down tasks comprise storing values of state parameters of the memory system to the nonvolatile cache.

* * * * *